SERIES TRANSISTOR CIRCUIT

Filed Sept. 2, 1959 3 Sheets-Sheet 1

INVENTOR:
JOHN STONE, IV
BY Howson & Howson
ATTYS.

INVENTOR:
JOHN STONE, IV
BY Howson & Howson
ATT'YS.

SERIES TRANSISTOR CIRCUIT

Filed Sept. 2, 1959 3 Sheets-Sheet 3

INVENTOR:
JOHN STONE IV
BY Howson & Howson
ATTYS.

United States Patent Office 3,018,433
Patented Jan. 23, 1962

3,018,433
SERIES TRANSISTOR CIRCUIT

John Stone IV, Pennsauken, N.J., assignor to The Franklin Institute of the State of Pennsylvania, Philadelphia, Pa., a corporation of Pennsylvania Filed Sept. 2, 1959, Ser. No. 837,696
19 Claims. (Cl. 323—79)

The present invention relates to a transistor circuit whereby transistors connected in series may be forced to have a controlled relative voltage drop across them in a predetermined ratio. The resulting circuit employing a series connection of transistors can be used in turn in a great many circuits of which a regulator circuit is representative in order to obtain greater operating capacities than have heretofore been possible.

Heretofore wherever transistors have been attempted to be series connected, there has been a serious problem about maintaining in the same ratio the relative voltage drops across each of the transistors under particular operating conditions. Even well matched transistors differed somewhat in actual characteristics, and characteristics tend to change with age and use. As a consequence, because of uncertain performance and inefficient use of their properties, transistors have not been useful in series connection for a great many applications. For example, where high voltage is required, series connected transistors usually cannot be used because of their voltage variations and, therefore, a single transistor had to be used often at great expense. Alternatively, relatively complex and expensive circuit arrangements have had to be used to achieve the same results as could be achieved with series transistors if the voltage across each of the transistors could be maintained the same. In many applications it is desirable to operate at voltages higher than the highest rated transistors available. In some cases, to avoid expense, tubes have been used where it would otherwise be desirable to use transistors, despite the accompanying increased bulk of the equipment and less efficient operation.

The present invention is directed to a simple circuit whereby transistors can be connected in series. The thing which makes this possible is the ability to maintain a predetermined ratio of voltage drop across each of the transistors at all times and thereby avoid error and distortions in the output. This is accomplished by the use of a bridge or ladder circuit which forces immediate correction of any error which would otherwise occur. Error correction is accomplished by an intermediate error correction transistor which normally is required to handle much smaller currents than those passing through the series transistor circuit. This error correction transistor occupies a bridging position in a bridge or ladder circuit made up of the series transistors and matched series resistors having resistances proportional to the desired voltage ratio. Between each adjacent pair of series transistors and each adjacent pair of resistors, one such error correction transistor is located, the error correction transistors being of the opposite type from the series transistors.

In order to use the system of the present invention a signal input must be provided, usually across one of the series transistors. A D.C. bias or control voltage applied across part or all of the network may thereby be controlled or regulated to produce an output effect preferably across a load resistor in series with the series transistor circuit.

As will be seen from the discusison hereafter, the accuracy of the performance of this circuit makes it ideally suited for use as a voltage regulator circuit. Very little modification is required for this use and its accuracy exceeds more complex regulator systems. Additionally, the circuit is useful in a great many control functions where a small input control signal is required to regulate a much higher energy output. Thus it may be used as a control rheostat for a D.C. motor using a minimum of input or control power. It may likewise be used to use a small signal, such as one from a thermocouple, to regulate a control circuit such as to a main furnace heating element. Almost any high power system can be regulated by this circuit from a low power source. Examples of such systems are a control clutch and an electrical variable speed drive.

The circuit of the present invention enables the substitution of several small and inexpensive transistors for a single large and costly transistor. Prior to the present invention this could not be done where a high quality of performance or a high degree of control was required. Moreover, many application jobs which could not be performed by transistors because of capacity limitations can now be performed by the circuit of the present invention, and often at major cost savings.

For a better understanding of the present invention, reference is made to the following drawings, in which FIG. 1 shows superimposed transistor characteristics;

Figure 1:
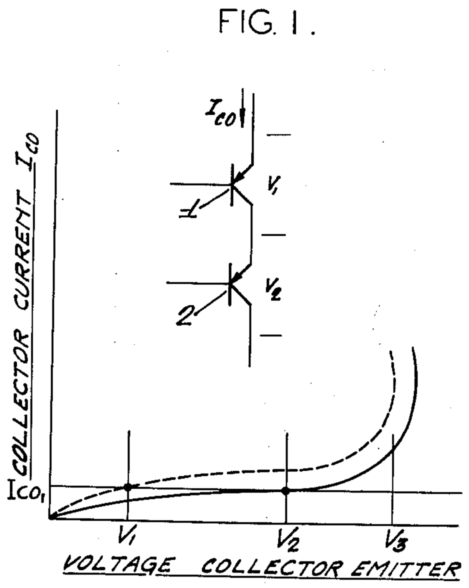

FIG. 1 illustrates the difficulties encountered in operating transistors connected in series without the benefit of the present invention. The solid line curve illustrates the collector to emitter voltage versus collector current characteristic of one transistor. The dashed line curve illustrates the corresponding characteristic of a second transistor. As these two transistors are connected in series, as shown by the inset circuit, and a voltage is applied across this series circuit, it will be seen that for a given collector current $I_{CO_1}$, which is common to the two transistors, the voltage $V_1$ across transistor 1 will be much less than the voltage $V_2$ across transistor 2. The voltage $V_3$ indicates the break-down voltage or maximum collector to emitter voltage rating of the transistors chosen for this description. It can be seen that $V_2$ is considerably larger than $V_1$ and that transistor 2 would, therefore, be dissipating the greater amount of power of the two transistors described. However, the position of $V_2$ relative to the break-down voltage may represent the highest safe operating voltage for that transistor. It will be recognized that the series current through both transistors is the collector current for both so that if $V_2$ is at its maximum safe value by limiting the series current it limits to an inefficient level the voltage $V_1$ across transistor 1. The voltage across one is considerably larger than across the other, but this situation will be appreciated by those skilled in the art as typical in view of the nature of this characteristic. In any multiple series transistor circuit one transistor's maximum safe voltage will limit the current through the other transistors, causing them to operate at lower voltages with corresponding smaller efficiency and low total system voltage relative to what might be judged from individual transistor capabilities. Therefore, if transistors are to be used efficiently in series, some means is required to cause them to share equal voltages at a higher efficient voltage level. The present invention accomplishes this end.

Figure 2:
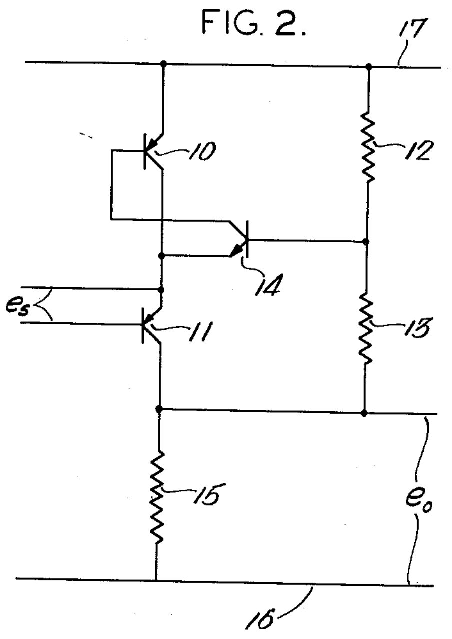
FIG. 2 is a schematic diagram showing the bridge circuit of the present invention.

FIG. 2 illustrates a bridge-type circuit in accordance with the present invention that divides the voltage between transistors 10 and 11 in relation to the resistors 12 and 13. In this circuit the error correction transistor 14 measures the error voltage in the bridge and controls the impedance of transistor 10 to match the impedance of transistor 11 where resistors 12 and 13 have equal resistance. In the arrangement shown, the series transistors 10 and 11 are PNP type, and the error correction transistor 14 is an NPN type. The types may be reversed but, since the PNP type are normally more readily available, particularly in larger sizes, the arrangement first described is preferred. Being connected in the bridge network, the collector of transistor 10 is connected to the emitter of transistor 11. Since equal voltage is desired across the transistors 10 and 11, resistors 12 and 13 are selected of the same size and are connected together, and the emitter of transistor 10 is connected to the free terminal of resistor 12 while the collector of transistor 11 is connected to the free terminal of resistor 13. The error correction transistor 14 has its base connected to the junction between the resistors 12 and 13 and its collector connected to the base of transistor 10 and its emitter connected to the common connection between transistors 10 and 11.

A signal $e_s$ may be applied to transistor 11 between the base and emitter thereof. A load resistor 15 is connected between the collector of transistor 11 and a negative potential lead 16. The other end of the bridge circuit is connected to a positive lead 17. An input D.C. potential across line 16 and 17 may be controlled or modulated by the input signal $e_s$ at transistor 11 to provide a signal output across resistor 15.

As the input signal $e_s$ is applied to the transistor 11, thereby reducing its impedance, the bridge will become unbalanced such that the potential of the base of transistor 14 becomes more positive than its emitter, making transistor 14 become a lower impedance. By virtue of the effectively lower impedance of transistor 14, the base of transistor 10 will become more negative causing transistor 10 to become a lower impedance until the bridge is balanced again. This result will obtain until the impedance of transistor 11 has reached saturation and its voltage drop is in the order of one volt. At this time the error between transistor 10 and 11 in relation to the resistors 12 and 13 becomes large due to the saturation voltage of transistor 14.

If the resistors 12 and 13 are equal, then in saturated condition the voltage across transistor 10 will be about one volt higher than that across transistor 11. The accuracy of this voltage dividing function is the function of two components. First, if the current through the resistors 12 and 13 is in the order of the base current drawn by resistor 14, the error will progressively increase as the signal is increased and the required load current goes up. Second, the gain of transistor 14 will also determine the magnitude of the error. A Darlington circuit can be used, if required, to decrease the amount of error currents required. Because of these limitations in selecting the components, first the minimum allowable current in the load circuit should be determined to establish values for resistors 12 and 13. If this is not done, the error signal will progressively increase, as previously mentioned. Next, the amount of base current for transistor 14 should be established for the maximum output current condition. This will determine the current gain required for transistor 14. Thereafter, it can be seen that if the transistor selected as transistor 10 be similar to transistor 11 and resistor 12 is equal to resistor 13 the voltage across the load resistor 15 can be made to swing approximately twice the permissible range of voltage across one transistor, as will be demonstrated hereafter by circuit analysis.

Figure 3:
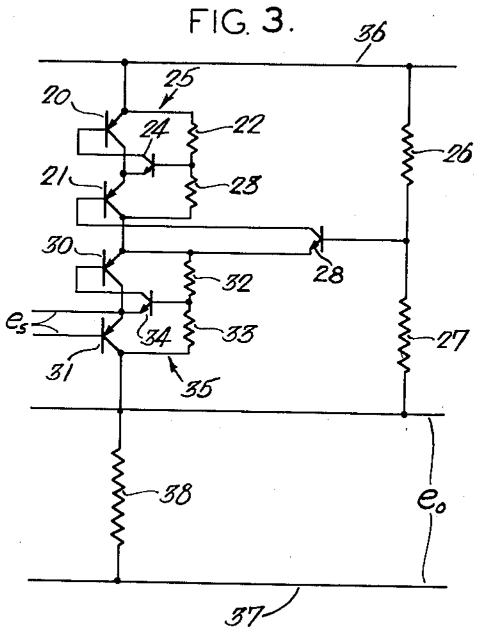
FIG. 3 is a multiple series transistor circuit employing complex bridge arrangements.

Referring to FIG. 3, it will be seen that the system there illustrated employs two bridge circuits of the type shown and described in FIG. 2. This is one possible way of using more than two transistors. As illustrated in FIG. 3, transistors 20 and 21 are connected in a bridge circuit with resistors 22 and 23, and error correction transistor 24, exactly as taught in FIG. 2. Similarly, transistors 30 and 31 are connected in series and applied in a bridge circuit with resistors 32 and 33, and a bridging error transistor 34, exactly as taught in FIG. 2. The circuit elements 20, 21, 22, 23 and 24 are used to form a circuit component 25, and the circuit elements 30, 31, 32, 33 and 34 are used to produce a circuit component 35. By virtue of connecting the components 25 and 35 in series by successive collector emitter connections the series circuit of four transistors is obtained. A matched pair of resistors 26 and 27 are then employed in a bridge circuit with circuit components 25 and 35 and error correction transistor 28 is employed with its base connected between resistors 26 and 27 and its collector connected to the base of transistor 21 and its emitter connected to the common connection between the collector of transistor 21 and the emitter of transistor 30. Thus it will be seen that in addition to the transistors 20, 21, 30 and 31 being connected in series intermediate each pair of transistors is provided an error correction transistor 24, 28 and 34. Each of these is of the opposite type of the series transistor. Signal $e_s$ is applied between the base and emitter of transistor 31 and may be used to control a large D.C. voltage applied between conductors 36 and 37 of which conductor 36 is positive and conductor 37 is negative. The output voltage appears across load resistor 38 which connects the overall bridge circuit with the lead 37. More specifically, the resistor 27 and transistor 31 with lead 37. Lead 36 is connected to the transistor 20 and resistor 26.

Figure 4:
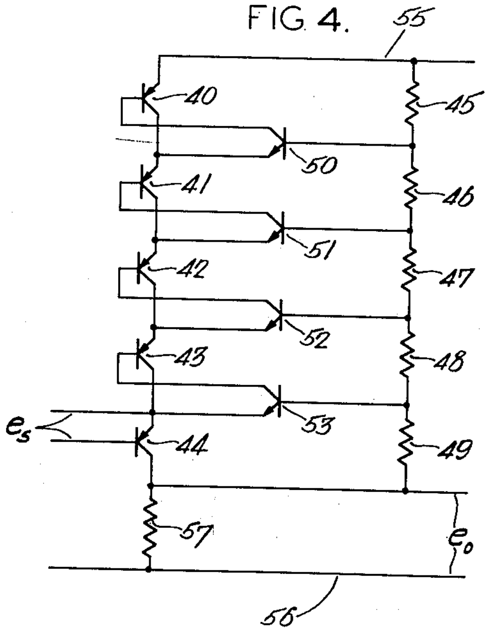
FIG. 4 is another multiple series transistor circuit.

Whereas the system and circuit of FIG. 3 may have certain advantages for certain applications, the more flexible and more generally useful circuit for more than two transistors in series is the ladder circuit shown in FIG. 4. In this circuit transistors 40, 41, 42, 43 and 44 are all connected in series emitter to collector, and are preferably PNP type transistors. A corresponding number of resistors 45, 46, 47, 48 and 49 are connected in series and connected at each end to transistors 40 and 44, respectively. Extending between each adjacent pair of resistors and each adjacent pair of series transistors are error correction transistors 50, 51, 52 and 53. As in the systems of FIG. 2 and FIG. 3, if the series transistors are PNP type the correction transistors are NPN type with their bases connected between the resistors and their collectors connected to the base of the control transistor and the emitter connected to the common connection between the transistors. Again, a signal $e_s$ is applied transistor 44 and enables control of a D.C. voltage applied across positive line 55 connected to the circuit at the end terminated in transistor 40 and resistor 45 and negative lead 56 connected by load resistor 57 to the end of the circuit terminated by transistor 44 and resistor 49.

It should be noted that the four transistors in series in FIG. 3 permit four times as much voltage amplification as a single transistor, and the five transistors in FIG. 4 permit five times as much voltage amplification. It can be said that for "*n*" transistors connected in series the power output will be *n* times that of one transistor for approximately the same power input.

In order to handle more current, the series connected transistors can have other transistors parallel connected with each of them. The transistors connected in parallel allow more current to be controlled but since the transistor is a current gain device they will also require more current input.

Figure 5:
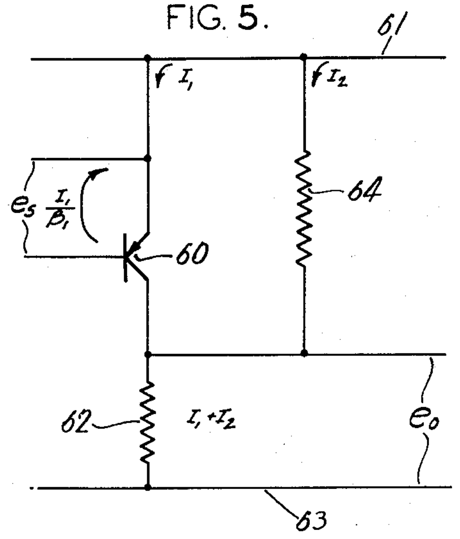
FIG. 5 is an analysis diagram of a single transistor circuit.
Figure 6:
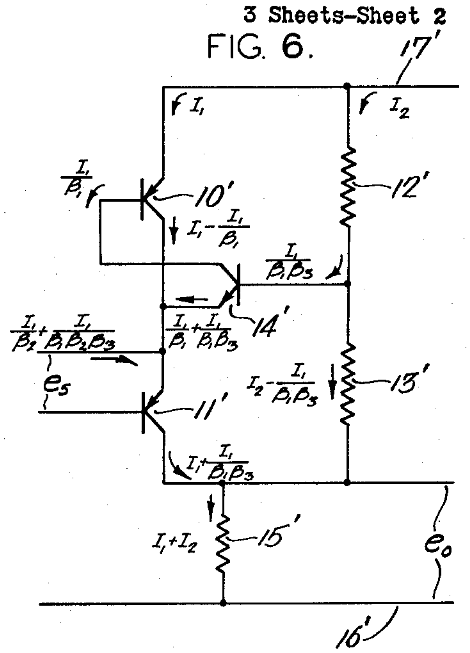
FIG. 6 is an analysis diagram of the circuit of FIG. 2.
Figures 7, 8:
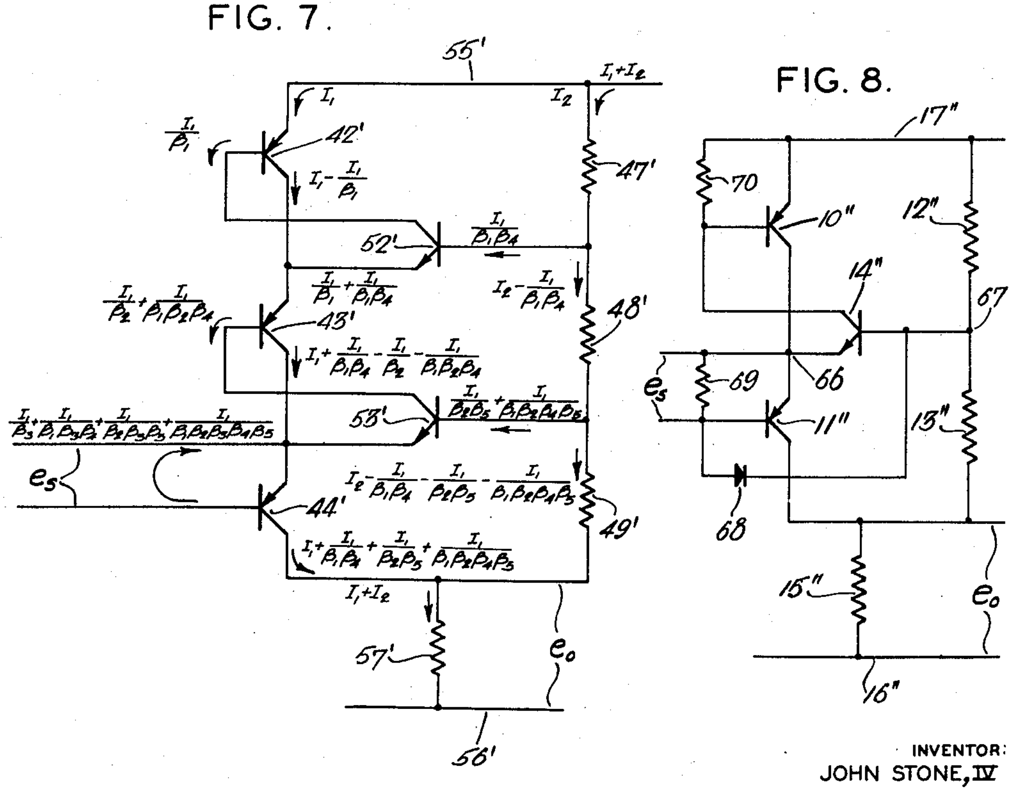
FIG. 7 is a three-series transistor network.
FIG. 8 shows the series transistor circuit of FIG. 2 modified for use as a voltage regulator.

FIGS. 5, 6 and 7 are included as analysis diagrams to show the relative currents which flow in the circuits illustrated.

FIG. 5 shows the conventional single transistor amplifier circuit wherein a single transistor 60 has a signal input $e_s$ applied across the base and emitter of the transistor, the emitter being connected to a positive D.C. voltage line 61 and the collector being connected through a load resistor 62 to a negative D.C. line 63. Parallel with the transistor 60 is a resistor 64. The resistor 64 would normally not be employed, but was used in comparative tests to obtain a similar output effect across the load resistor to that obtained with the circuits of FIGS. 6 and 7.

The system of FIG. 6 is exactly the same as the system of FIG. 2 and similar parts are designated by similar numbers with the addition of primes thereto.

The circuit of FIG. 7 is more nearly like the circuit of FIG. 4 than any other but has only three, instead of five, series transistors. Corresponding elements have been given corresponding designators with the addition of primes thereto.

In each of the diagrams $I_1$ represents the current which flows into the emitter of the first of the series transistors. Current $I_2$ is the current passing through the first in the series of bridging resistors. The current gain of each transistor is $\beta$. In each of these diagrams, the signal voltage $e_s$ is applied across one of the transistors.

In FIG. 5, $e_s$ is applied across the only transistor 60 and will have to supply a current equal to $I_1$ divided by $\beta_1$. The current $I_2$ passes through resistor 64 and is confluent with $I_1$ through load resistor 62.

In FIG. 6 the main stream of current $I_1$ likewise passes through the series connected transistors 10' and 11' and joins the main stream of current $I_2$ after having passed through resistors 12' and 13' to flow through load resistor 15'. The control signal $e_s$ in this case must be able to supply $I_1$ divided by $\beta_2$ plus $I_1$ divided by $\beta_1\beta_2\beta_3$. The currents that are produced by this current as a result of this signal current are shown in FIG. 6.

FIG. 7 is much like FIG. 6 in its analysis and the various currents are shown on the network. To draw current $I_1$ at the emitter of transistor 42', a current at the base of transistor 44' must be able to supply $I_1$ divided by $\beta_3$ plus $I_1$ divided by $\beta_1\beta_3\beta_4+I_1$ divided by $\beta_2\beta_3\beta_5$ plus $I_1$ divided by $\beta_1\beta_2\beta_3\beta_4\beta_5$.

FIG. 8 shows a variation of the circuit of FIG. 2 which is intended to permit operation of the series transistors close to cut-off. Corresponding circuit elements have been given similar designations with the addition of double primes thereto. Under these circumstances, it is quite possible for transistor 11'' to have a higher impedance than transistor 10''. When this occurs, the transistor 14'' cannot control transistor 10'' to make it a higher impedance and, therefore, the bridge cannot balance at no-signal input and the line voltage can fall completely across the transistor 11''. In this condition, the voltage at point 66 will be more positive than the voltage at point 67. In order to control this initial condition, the base of transistor 11'' will have to be made more negative than at the point 66. By connecting the base of transistor 11'' to point 67 through a diode 68, this initial condition of control will be satisfied. As long as point 66 is more positive than point 67, the current will flow through resistor 69, making the base of transistor 11'' more negative than point 66. The impedance of transistor 11'' then decreases until the voltage between point 67 and point 66 is nearly zero. The voltage drops across transistors 10'' and 11'' will then divide up as the voltages across resistors 12'' and 13''.

Actual tests were made using two dissimilar transistors in the circuit generally of the type of FIG. 8. The first test was performed with the transistors connected as in the FIG. 2 arrangement where no diode is employed and with the transistor 11 having a lower impedance than transistor 10. The voltages across the transistors under these circumstances divide quite equally during change in signal input. In the second test, the transistors 10 and 11 were interchanged and, at the initial conditions, the voltage across the transistor in position 11 proved much larger than that across transistor 10, and this condition remained until the signal had decreased the impedance of transistor 11 to a value equal to that of transistor 10. From then the voltage was divided equally and performance was as described. Finally, the test set up was modified to the arrangement of FIG. 8, with the addition of diode 68. This caused the voltage across transistors 10 and 11 to again be approximately equal even though the transistor characteristics are quite dissimilar. The same problem can, of course, occur in a ladder circuit and can be solved in a same manner, using diodes in essentially the same way. In other instances, transistors can be used in place of the diodes. The substituted transistors would be of the same type as the series transistors and would have their emitter connected to the series transistor base, i.e., the base of the transistor 11''. The base of the transistor would be connected to the base of the error correction transistor 14''. Finally, the collector of the transistor would be connected to the collector of the transistor 11''.

Resistors 69 and 70 are of about the same impedance as the transistor input connected across the base to emitters of transistors 11'' and 10'', respectively. This is done to reduce the quiescent current of the transistor and gives some thermal stability.

It should be noted that the series transistors need not be matched and it is not necessary that their original characteristics be matched. For any mismatch in transistor characteristics, the circuit will always maintain the same voltage across the series transistors as determined by the resistors making up the other legs of the bridge or ladder circuit. This is the essence of the present invention.

Figure 9:
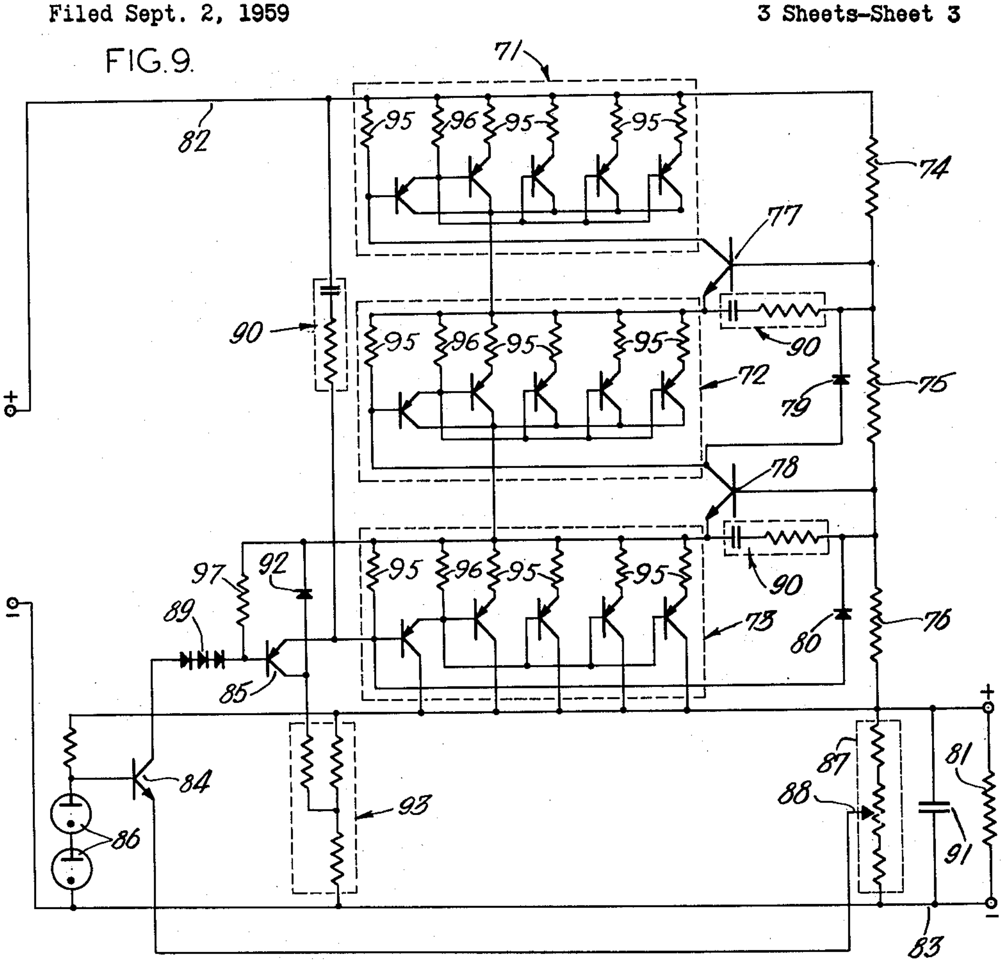
FIG. 9 is a circuit diagram of a preferred regulator arrangement.

The advantage of the present invention used as a regulator can perhaps be better understood by a specific example. One example, illustrated in FIG. 9, is that of a 300 volt regulator whose output is to be adjustable plus or minus 10% and be capable of handling from 0 to 4 amperes of load current. The circuit consists of a ladder network three series transistor banks 71, 72, 73, each of which consists of four transistors connected in parallel in order to handle the heavy current. The .1 ohm resistors 95 in series with each of the emitters is necessary when connecting transistors in parallel to provide negative feedback and force the parallel transistors to more evenly share the total load current. A 25 ohm resistor 96 shunts the base to emitter to provide reduced quiescent collector current and give thermal stability to the system. A Darlington circuit is used at the input of each of these elements to reduce the current requirements of the error sensing transistors 77 and 78. A 1000 ohm resistor 97 performs the same function for this transistor as the 25 ohm resistor does for the parallel connected transistors.

These three banks of transistors 71, 72, 73 are connected with the resistors 74, 75, 76 of equal resistance as taught above in connection with FIG. 7. The error sensing transistors 77 and 78 are used to insure the voltage drops being equal across each of the three series banks. The diodes 79 and 80 insure that these voltages in the quiescent condition will remain equal. This series network connected between lines 82 and 83 through load resistor 81 constitute the main control portion of the regulator. The error sensing transistor 84 is used to measure the error voltage appearing between the reference diodes 86 and the feedback network 87 to the adjustable potentiometer 88. The transistor 85 is used to give further current amplification after the series elements and thereby reduce the amount of regulation of the circuit due to current changes through the error sensing transistor 84. The diodes 89 are used to drop the potential between transistors 85 and 84 to a level such that transistor 84 will not be required to exceed its voltage limitations. The series resistance capacitance elements 90 are used to accomplish phase shift in the system such that in closed loop operation, the system will be stable. One of the limitations of this circuit design was that no electrolytic capacitors were to be used. It was decided, therefore, that the shunting capacitance 91 across the output terminals should be limited to 100 microfarads. A larger shunting capacitor 91 would have provided enough attenuation at higher frequencies such that elements 90 would not be needed.

The diode 92 is used to maintain a relative constant operating voltage drop for transistor 85. The resistor network 93 serves as a voltage divider such that the diode 92 will be in its correct operating range. The network 93 with the diode 92 is then used to lower the voltage level of transistor 85 to a level lower than the collector voltage of the series element 73.

Figure 10:
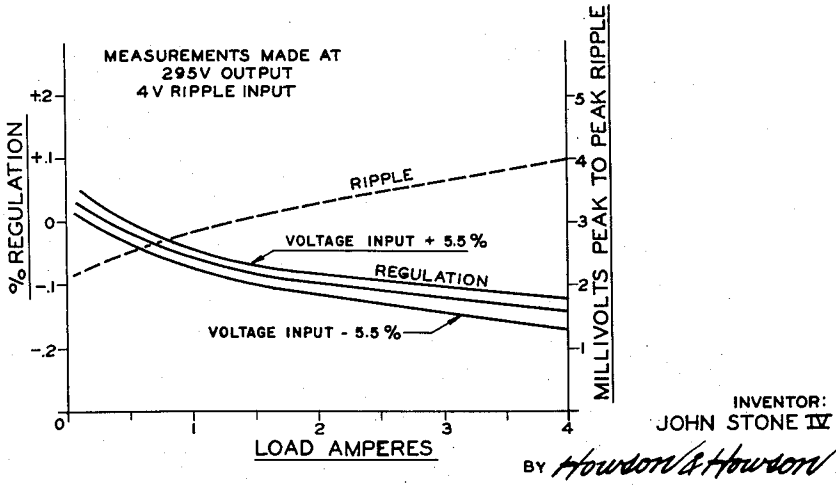
FIG. 10 is a graph showing some of the regulator characteristics.

FIG. 10 is a diagram showing the regulation characteristics of this 300 volt regulator and the noise and ripple appearing in the output voltage. It is seen that with an input variation of plus or minus 5.5%, the output voltage varied approximately .05%. The regulation from 0 to 4 amperes of load is in the order of .15% giving a total regulation for line and load of approximately .2%. The ripple appearing in the output voltage increased from two-thousandth of a volt peak to peak at no load to four-thousandth of a volt peak to peak at 4 amperes load. The output is adjustable plus or minus 10% about the normal value of 300 volts. This means that the series elements 71, 72, 73 must be able to withstand a maximum voltage of 115 volts and be able to dissipate a maximum of 440 watts. This would be very difficult to do with a single transistor.

Another regulator was developed to supply a normal voltage of 150 volts and to deliver 4 amperes of current. This regulator required the use of two transistors connected in series in order to be able to withstand the voltage required across the series element. The maximum voltage across the series element in this regulator was 55 volts and the maximum power to be dissipated by the series element was 220 watts. Again, a single transistor would not be capable of handling this situation.

Regulator circuits have been described to illustrate practical applications of the present invention. It will be clear to those skilled in the art that the regulators described can be modified within the scope of the invention and other types of regulators devised.

The specific examples above have all employed resistors of the same size in the ladder or bridge network. For regulators or other devices seeking maximum power output such arrangement is needed. However, the wide range of applications for the series connection of transistors will include other situations in which the voltages across the series transistors should be in some ratio other than 1:1. The circuit of the present invention is adapted to permit any desired distribution of voltage by selection of resistors having resistances in the desired ratio and locating the appropriate resistor opposite the corresponding transistor in the ladder network. The circuits described above in FIGS. 2, 3, 4, 6, 7, 8 can be appropriately modified without changing the appearance of those circuits and it will therefore serve no useful purpose to reproduce such circuits to illustrate circumstances where voltages are to be obtained in a ratio other than 1:1. It will be clear that the circuit of the present invention is subject to a great many applications other than regulators. All such modifications and variations of the circuit of the present invention within the scope of the claims are intended to be within the scope and spirit of the present invention.

I claim:

1. A series circuit whereby a pair of transistors may be connected in series with the voltage across one held to a predetermined ratio of the voltage across the other comprising a pair of transistors of the same type connected in series, a pair of resistors having resistances in proportion to the predetermined ratio of voltages across the series transistors connected in series and connected to the transistors at their ends, and a bridging transistor of opposite type from the series transistors coupling the point between the series resistors with the common series connection of the transistors and the base of the series transistor whose voltage is to be corrected whereby a signal applied to one of the series transistors produces an error signal in the bridging transistor which corrects the voltage in the other series transistor through its base connection until the voltages across both series transistors are approximately in the predetermined ratio.

2. A series circuit whereby transistors may be connected in series with the voltage across each held at predetermined ratios to the voltages across the others comprising a plurality of series transistors of the same type connected in series, a corresponding number of resistors having resistances in said predetermined ratio connected in series and connected at the ends of the series circuit to the ends of the transistor circuit, and bridging transistors of opposite type bridging the points between the series resistors with the corresponding common series connector between the series transistors and the base of the series transistor whose voltage is to be corrected in a ladder network whereby a signal applied to one of the series transistors will produce error signals in the bridging transistors which correct the voltages in the other series transistors until the voltages across all series transistors are approximately in the predetermined ratio.

3. A series transistor circuit whereby multiple pairs of transistors may be connected in series with the voltage across each of them held to a predetermined ratio of the voltage across the others, comprising at least two pairs of series transistors of one type connected in series, two pairs of resistors having resistances in proportion to the predetermined ratio of voltages across the series transistors, each pair of resistors connected in series and connected with each pair of transistors at their ends, a bridging transistor of opposite type bridging the point between the series resistors with the common connection between the series transistors and the base of the series transistor whose voltage is to be controlled whereby a signal applied to one of the series transistors produces an error signal in the bridging transistor which corrects the voltage in the other series transistor until the voltages across both series transistors in each pair are approximately in the predetermined ratio, the series connection connecting all of the series transistors serving as a connection connecting the bridge circuits described in series and establishing each bridge circuit as a component of a further bridge, a pair of resistors having resistances in proportion to the predetermined voltage ratio desired connected in series, with their ends connected to the unattached ends of the component bridge circuits, and a bridging transistor of opposite type from the series transistors bridging the point between the resistors with the series connection between the two component bridge circuits and the base of the series transistor in one of the component bridge circuits whose voltage is to be corrected.

4. The circuit of claim 1 in which the transistors are emitter-collector connected, signal is applied between the base and emitter of one of the series transistors, and the bridging transistor is connected with its base to the series resistor junction, its emitter to the common collector-emitter connection between the series transistors and its collector to the base of the series transistor, whose voltage is to be corrected.

5. The circuit of claim 2 in which transistors are emitter-collector connected, a signal is applied between the base and emitter of one of the series transistors, and the bridging transistors are each connected with its base to a series resistor junction, its emitter to the corresponding common collector-emitter connection between series transistors corresponding in the latter to the series resistors and its collector to the base of the series transistor whose voltage is to be corrected and which is located immediately adjacent the common connection to which its emitter is connected.

6. The circuit of claim 4 in which a semi-conducting path is arranged so that current flow can occur in the direction from the base of the series transistor immediately prior to the error correction transistor and base of that adjacent error correction transistor on the side remote from the signal application.

7. The circuit of claim 5 in which a semi-conducting path is arranged so that current flow can occur in the direction from the base of the series transistor immediately prior to the error correction transistor and base of that adjacent error correction transistor on the side remote from the signal application.

8. The circuit of claim 6 in which the semi-conducting device is a diode.

9. The circuit of claim 7 in which the semi-conducting device is a diode.

10. The circuit of claim 6 in which the semi-conducting device is a transistor connected in the direction of flow emitter to base with its collector connected to the collector of the series transistor to whose base the emitter is connected.

11. The circuit of claim 7 in which the semi-conducting device is a transistor connected in the direction of flow emitter to base with its collector connected to the collector of the series transistor to whose base the emitter is connected.

12. The circuit of claim 1 in which the bridge is connected at one end to a fixed potential line and at its other end to a fixed potential line through a load resistor.

13. The circuit of claim 2 in which the bridge is connected at one end to a fixed potential line and at its other end to a fixed potential line through a load resistor.

14. The circuit of claim 1 in which the resistors are equal so that maximum power output can be obtained from the circuit.

15. The circuit of claim 2 in which the resistors are equal so that maximum power output can be obtained from the circuit.

16. The circuit of claim 12 in which the series transistors are PNP type and the error correction transistors are NPN type.

17. The circuit of claim 13 in which the series transistors are PNP type and the error correction transistors are NPN type.

18. The circuit of claim 12 in which the series transistors are NPN type and the error correction transistors are PNP type.

19. The circuit of claim 13 in which the series transistors are NPN type and the error correction transistors are PNP type.

No references cited.